United States Patent [19]

Ross

[11] 4,271,473
[45] Jun. 2, 1981

[54] CONTROL OF PARALLEL OPERATED TURBINES IN COGENERATION

[75] Inventor: Charles W. Ross, Hatboro, Pa.

[73] Assignee: Leeds & Northrup Company, North Wales, Pa.

[21] Appl. No.: 79,278

[22] Filed: Sep. 27, 1979

[51] Int. Cl.³ .................. G06F 15/46; F01D 17/00
[52] U.S. Cl. ........................ 364/494; 60/706; 60/711; 290/4 R; 290/40 R
[58] Field of Search ............ 364/105, 106, 492, 493, 364/494, 495; 60/662, 698, 706, 707, 711, 715, 660, 663, 667; 290/4 R, 4 A, 4 D, 40 R

[56] References Cited

U.S. PATENT DOCUMENTS

| | | | |
|---|---|---|---|
| 3,391,539 | 7/1968 | Dimitroff, Jr. et al. | 60/662 |
| 3,623,324 | 11/1971 | Eggenberger | 60/711 |
| 3,930,367 | 1/1976 | Gasparoli | 290/4 R X |
| 4,007,595 | 2/1977 | Braytenbah | 364/494 X |
| 4,039,846 | 8/1977 | Vance | 364/492 X |
| 4,069,675 | 1/1978 | Adler et al. | 364/492 X |

Primary Examiner—Joseph F. Ruggiero
Attorney, Agent, or Firm—William G. Miller, Jr.; Raymond F. MacKay

[57] ABSTRACT

A control system is provided for turbines in the utility part of an industrial plant using cogeneration so that control is maintained over the relative quantities of steam supplied to a common steam header from both the back pressure and the extraction turbines where the header supplies process steam at a predetermined pressure. The steam flow from a stage of the extraction turbine is controlled to maintain the header pressure at its desired value. The steam flow thus controlled is measured and a control means is provided to control the steam flow from a back pressure turbine supplying the same header so as to maintain a predetermined relationship between the two steam flows while maintaining electrical generation from the generators driven by the turbine at a maximum consistent with maintenance of an adequate control range for the header pressure control.

2 Claims, 2 Drawing Figures

CONTROL OF PARALLEL OPERATED TURBINES IN COGENERATION

BACKGROUND OF THE INVENTION

Many industrial plants in the pulp and paper industry and the petro-chemical industry have a utility part which is a multiunit power plant for providing both electrical energy and process steam by cogeneration. The objective of this utility part of the industrial plant is to load the boilers, the turbine generators, and the tie lines supplying electrical power according to cost, consistent with system constraints and the desired controllability of the header pressure controls. Thus, for example, where a backpressure and an extraction turbine are operating in parallel to maintain a header pressure, it is desirable to divide the steam demand for the particular header being supplied so that the most economic division of load between the two turbines is accomplished while maintaining the desired controllability on the header pressure. In some cases the cost curves for the turbines supplying the header overlap and equal incremental cost loading may be used to arrive at an economic division of the load. However, for many combinations of back-pressure and extraction turbines there is no overlap of the cost curves and another approach must be used.

It is therefore an objective of this invention to provide a method and means for dividing the steam load on a header between backpressure and extraction turbines which will provide an economic division of the steam load while maintaining controllability on the header pressure control.

In accordance with the above object there is provided a control system for turbines in the utility part of an industrial plant using cogeneration which control system is operable to control the relative quantities of steam supplied from a plurality of steam turbines such as a backpressure and an extraction turbine to a common steam header which supplies process steam at a predetermined pressure while the electrical generation from the generators driven by said turbines is maintained at a maximum consistent with the maintenance of an adequate control range for the header pressure control on those turbines assigned to maintain header pressure, usually the extraction turbines supplying the header. The system includes means for measuring the header pressure combined with means for controlling the steam flow from a turbine such as an extraction turbine so as to maintain the header pressure at a set point. The system also includes means for measuring the steam flow to the header from the turbine being controlled to maintain the header pressure at its desired value as well as means for controlling the steam flow from the other turbines supplying the header to maintain a predetermined relationship between the steam flows from said turbines.

DESCRIPTION OF THE PREFERRED EMBODIMENT

Figure 1:
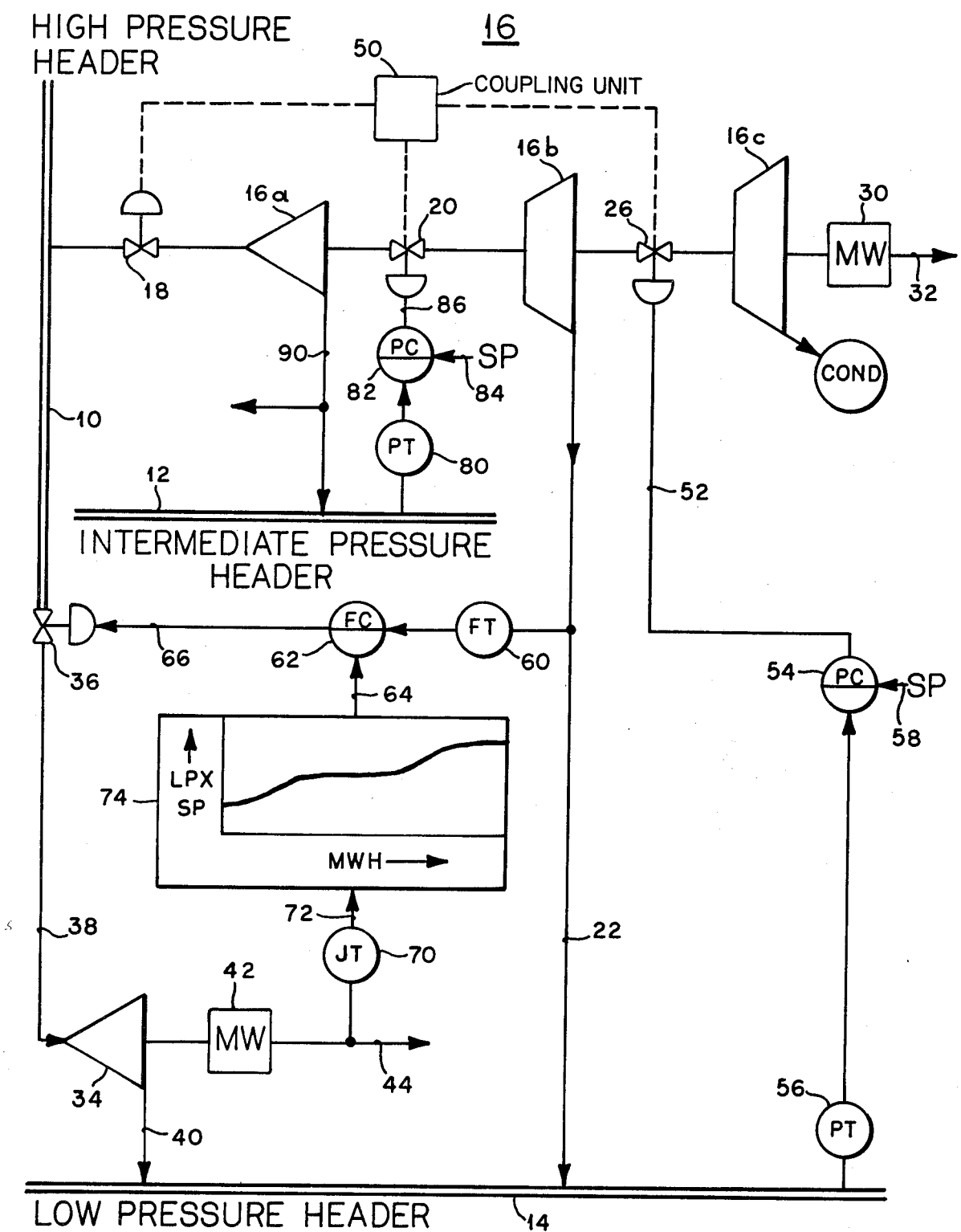
FIG. 1 shows in block diagram form one arrangement of the novel control system as it is applied to a backpressure turbine and an extraction turbine supplying a common header.

In the figure there are shown a portion of the utility section of an industrial plant which has three steam supply headers which provide steam to a process. These headers include a high pressure header 10, an intermediate pressure header 12, and the low pressure header 14. The high pressure header 10 which may be the output line of boilers (not shown) supplying steam to an extraction turbine 16 of the condensing type which includes a high pressure section 16A, an intermediate pressure section 16B and a low pressure section 16C, connected to the various headers such that the high pressure header 10 supplies steam to the high pressure section 16A through the throttling valve 18, with the high pressure section 16A supplying extraction steam flow to the intermediate pressure header 12. The high pressure section 16A is also connected through the extraction valve 20 to the intermediate pressure section 16B. The extraction steam flow from the intermediate pressure section 16B supplies the low pressure header 14 by way of line 22. The intermediate pressure section 16B also supplies the low pressure section 16C through extraction valve 26. As shown in the figure, the turbine 16 is mechanically coupled to operate the generator 30 to provide electrical power output on line 32.

In addition to the extraction type condensing turbine 16, the low pressure header is also supplied with steam from the back pressure turbine 34. The steam to the back pressure turbine 34 is supplied from the high pressure header 10 through throttle valve 36 and line 38 while the output steam from turbine 34 is supplied by way of line 40 to the low pressure header 14. The back pressure turbine 34 is mechanically coupled to operate the generator 42 so as to produce on output line 44 an electrical output which is normally combined with the output on line 32 to provide part of the electrical power to the plant.

It will be understood that a single industrial plant may include in its utility part a number of units. Thus, while there has only been shown in the figure two turbines, namely 16 and 34, it is not unusual for an industrial plant to include a large number of turbine units, both extraction type condensing turbines and back pressure units which are arranged to supply the steam to various headers which provide processed steam. Thus, while in the figure there is shown a means for supplying low pressure header 14 with steam from the extraction turbine 16 as well as the back pressure turbine 34, the supply of steam to the intermediate header may come not only from the extraction turbine 16 as shown in the figure, but also from another back pressure turbine, not shown. Thus, while the control system to be described below is for the proportioning of the steam supply from the extraction turbine 16 and the back pressure turbine 34 to the low pressure header, a similar control arrangement may be utilized to proportion the supply of steam from the extraction turbine 16 and a back pressure turbine not shown to the intermediate pressure header 12.

It is desired, as pointed out above, to control the relationship of the steam flow over lines 22 and 40 or, in other words, from turbine 16 and turbine 34, to the header 14 so as to maintain the pressure in the header 14 at the desired value while preserving the desired degree of controllability for the pressure control system for header 14. It will be evident from the figure that the pressure control of header 14 is carried out by controlling the extraction valves of turbine 16, namely the valves 20 and 26, and the throttle valve 18, as determined by the coupling unit 50 in response to operation of valve 26 by a signal on line 52 as an output from the pressure controller 54 which responds not only to the measured pressure signal as supplied by the pressure transducer 56, but also to the pressure setpoint signal as supplied to the controller on line 58. Thus, the deviation between the desired pressure in header 14 as represented by the signal on line 58 and the actual pressure as measured by the transducer 56 produces a control signal on line 52 which is effective to adjust the extraction valve 26. The controller 54 may include both proportioning and reset action and can be a standard type of controller as used in industrial control systems. For example, if the pressure in the low pressure header 14 falls below its setpoint value, the controller 54 will, by way of the signal on line 52, cause the control valve 26 to operate in a closing direction. As valve 26 closes, the steam flow in line 22 increases so as to maintain the pressure in header 14 at its desired value. As the control signal on line 52 is causing the valve 26 to operate in a closing direction, the coupling unit 50 is operating to cause the valves 18 and 20 to operate in an opening direction so that the modification of the extracted steam flows from the turbine 16 is generally such that the modification is carried out so that the electrical output produced on line 32 by generator 30 does not vary widely. The coupling unit 50 may be considered as including the mechanical coupling frequently used in extraction turbines or it may be considered as a means for separately operating the individual valves as provided for the turbine system.

As the steam flow in the line 22 changes in response to the action of the pressure control, that change is detected by the flow transmitter 60 which is operable by way of the flow controller 62 after the measured value has been compared with the desired value as represented by the signal on line 64 to produce a control signal on line 66 to throttle valve 36 which will be effective to modify the steam flow in line 38 and line 40 to the header 14. It will be evident that as the steam through the back pressure turbine 34 is thus modified the output of the generator 42 as measured by the transducer 70 is also modified and, in fact, is proportional to the steam flow in line 40. The output of the transducer 70 on line 72 provides an input to the function generator 74 indicative of the megawatt output of generator 42. The function generator 74 then produces on line 64 a signal indicative of the setpoint for the steam flow on line 22. The relationship between the input and output of function generator 74 is desirably determined so as to maintain valve 26 within a suitable range to maintain controllability for the pressure control and so as to take into account the relative economies of the extraction turbine 16 and the backpressure turbine 34 at different output levels. The characteristic of the function generator 74 may, for example, be similar to that shown graphically in the block 74 representing the function generator. Thus the characteristic may be flat at the mid-range with a drop in the lower region and an increase in the higher region so that valve 26 would tend to be maintained near its 50% open point. The drop at the lower end may be more pronounced when the incremental cost of the back pressure unit is greater at its low flow region.

The incremental cost characteristics of the backpressure turbine may thus be such that it is not monotonic in nature. For example, the incremental cost may reach a minimum value at a particular steam flow and may increase both with decreased steam flow as well as with an increased steam flow whereas it is likely that the incremental cost characteristic of the extractor turbine may be monotonic so that if there is an increased steam flow in line 22, an increased incremental cost factor will be applicable.

It will be evident that in order to maintain controllability for the pressure control system on the low pressure header 14, it is desirable that the extraction valve 26 should not be at or near its extreme open or closed position except in a transient situation, thus, any change in the opening of the extraction valve 26 resulting from the pressure controller 54 which takes it to or near an extreme position should be modified by a reapportionment of the supply to the header 14 by intermediate pressure section 16B over line 22 and the supply by way of the line 40 from backpressure turbine 34. Thus, it is appropriate that the setpoint for the steam flow in line 22 should be lower, relatively speaking, for low steam flow in line 40 as compared with the setpoint for higher steam flow values.

The intermediate pressure header has a pressure control system similar to that of the low pressure header, thus the pressure transducer 80 supplies a signal to pressure controller 82 which also receives on line 84 a signal representing a setpoint for the intermediate pressure header. The controller 82 compares the actual with the desired pressure values and provides a signal on output line 86 to the throttle valve 20 which serves to position that valve to correct the extracted steam flow from the high pressure section of turbine 16 so as to return the pressure in the intermediate pressure header 12 to its desired value.

As was mentioned with regard to the adjustment of the throttle valve 26 and the resulting related adjustments of the valves 18 and 20, it will similarly be desirable upon adjustment of the extraction valve 20 that there be appropriate adjustments also in the valves 18 and 26. Thus, if valve 20 is positioned so that it is in a more closed condition, it is desirable that the valve 18 be adjusted to be in a more open position and valve 26 in a more closed position so that the output on line 30 is as nearly constant as possible.

Figure 2:
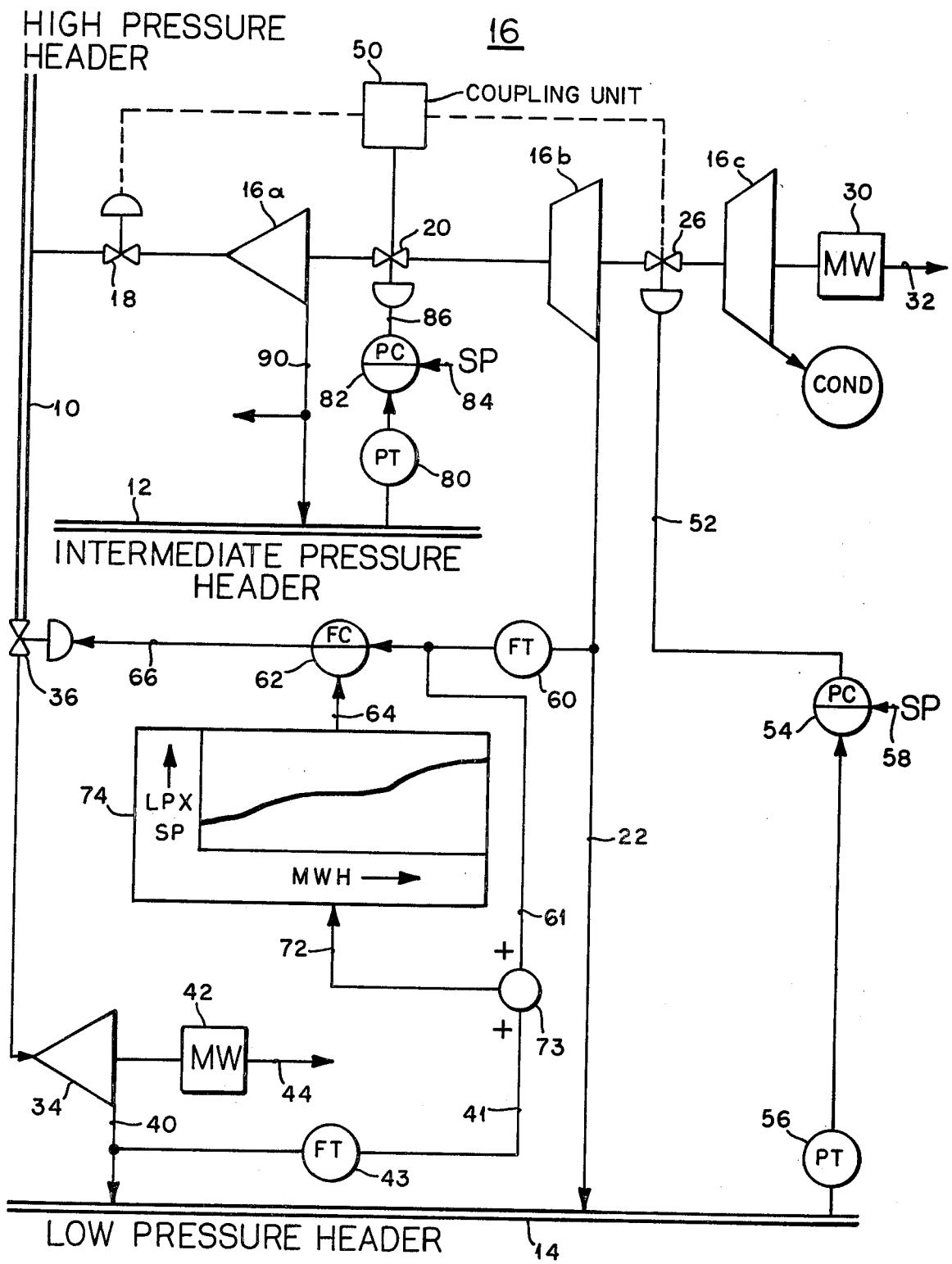
FIG. 2 shows another form of the invention.

In FIG. 2 there is shown a system for producing the same result as that produced by the system of FIG. 1. FIG. 2 differs from FIG. 1 in that the signal on line 72 is produced by summing in summer 73 the signals on lines 41 and 61 which are respectively indicative of the steam flow in lines 40 and 22 as that flow is measured by the respective transducers 43 and 60. Thus, in FIG. 2 the setpoint for the steam flow in line 22 is a function of the sum of the steam flow in line 22 and that in line 40.

It will be evident to those skilled in the art that the header pressure may be controlled by controlling a plurality of turbines which may be backpressure and/or extraction units instead of controlling just one, and the controllability of that pressure control may be maintained by changing the steam flow from a plurality of units whch likewise may be backpressure or extraction units.

It will also be evident to those skilled in the art that the loads on the various turbines may be mechanical loads such as pumps and fans as well as generators as shown in the figures. Also the extraction valves may be in series with the extraction flow and valve position signals may be used as feedback instead of extraction flows as shown in the figures.

What is claimed is:

1. A control system for turbines in the utility part of an industrial plant using cogeneration, said control system being operable to control the relative quantities of steam supplied from a plurality of steam turbines to a common steam header which supplies process steam at a predetermined pressure while maintaining the electrical generation from generators connected to and driven by said turbines at a maximum consistent with the maintenance of an adequate control range for a header pressure control on those turbines assigned to maintain header pressure, comprising:

means for measuring header pressure, means for controlling a steam flow from a first turbine to the header so as to control the header pressure toward a set point;

means for measuring a quantity indicative of said flow from said first turbine; and means for controlling the steam flow from another turbine supplying said header so as to maintain a predetermined relationship between the steam flow in said first and said other turbine, said means including, a throttle valve for controlling the steam flow to said header through said other turbine, a function generator receiving as an input a signal indicative of the flow of steam from said other turbine to said header and producing as an output a set point value indicative of the desired flow of steam from said first turbine to said header, and a controller responsive to the difference between said set point value and said measured steam flow from said first turbine for controlling said throttle valve to proportion the flow from said first and said other turbine as determined by the characteristic of said function generator.

2. A control system for turbines in the utility part of an industrial plant using cogeneration, said control system being operable to control the relative quantities of steam supplied from a plurality of steam turbines to a common steam header which supplies process steam at a predetermined pressure while maintaining the electrical generation from generators connected to and driven by said turbines at a maximum consistent with the maintenance of an adequate control range for a header pressure control on those turbines assigned to maintain header pressure, comprising:

means for measuring header pressure, means for controlling a steam flow from a first turbine to the header so as to control the header pressure toward a set point;

means for measuring a quantity indicative of said flow from said first turbine; and means for controlling the steam flow from another turbine supplying said header so as to maintain a predetermined relationship between the steam flow in said first and said other turbine, said means including, a throttle valve for controlling the steam flow to said header through said other turbine, a function generator receiving as an input a signal indicative of the total flow of steam from said first and said other turbine to said header and producing as an output a set point value indicative of the desired flow of steam from said first turbine to said header, and a controller responsive to the difference between said set point value and said measured steam flow from said first turbine for controlling said throttle valve to proportion the flow from said first and said other turbine as determined by the characteristic of said function generator.

* * * * *